（12）United States Patent
Nomura et al.

(10) Patent No.: US 8,769,666 B2
(45) Date of Patent: Jul. 1, 2014

(54) IMAGE PROCESSING DEVICE AND IMAGE PROCESSING SYSTEM

(75) Inventors: Tatsuo Nomura, Kyoto (JP); Katsuyoshi Fujiwara, Osaka (JP); Yuji Okamoto, Kyoto (JP); Naofumi Ueda, Kyoto (JP); Syoichiro Yoshiura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 2641 days.

(21) Appl. No.: 10/530,122

(22) PCT Filed: Oct. 1, 2003

(86) PCT No.: PCT/JP03/12561
§ 371 (c)(1),
(2), (4) Date: Feb. 23, 2010

(87) PCT Pub. No.: WO2004/031936
PCT Pub. Date: Apr. 15, 2004

(65) Prior Publication Data
US 2010/0141978 A1 Jun. 10, 2010

(30) Foreign Application Priority Data
Oct. 1, 2002 (JP) ................................. 2002-288629

(51) Int. Cl.
*G06F 21/00* (2013.01)

(52) U.S. Cl.
USPC ........ 726/17; 380/51; 380/54; 726/3; 726/26; 709/225; 705/7; 713/176

(58) Field of Classification Search
USPC .......................................................... 726/17
See application file for complete search history.

(56) References Cited

U.S. PATENT DOCUMENTS

| 5,703,696 | A | * | 12/1997 | Sakai et al. .................... 358/404 |
| 6,698,953 | B1 | * | 3/2004 | Hertlein ......................... 400/103 |
| 6,738,158 | B1 | * | 5/2004 | Lupien et al. ................. 358/1.16 |
| 6,954,532 | B1 | * | 10/2005 | Handley et al. .................. 380/54 |

(Continued)

FOREIGN PATENT DOCUMENTS

| JP | 61-198958 | 9/1986 |
| JP | 08-115277 | 5/1996 |

(Continued)

OTHER PUBLICATIONS

Secure Spread Spectrum Watermarking for multimedia|http://vada1.skku.ac.kr/ClassInfo/microsystem/multimedia/watermarking/JB00181998006007.pdf|Kilian at el|pp. 1673-1687|1997.*

*Primary Examiner* — Mahfuzur Rahman
(74) *Attorney, Agent, or Firm* — Edwards Wildman Palmer LLP; David G. Conlin; Steven M. Jensen

(57) ABSTRACT

An image processing device includes a plurality of printers (Pr1, Pr2, Pr3, Pr4, . . . ) and a plurality of client machines (PC1, PC2, PC3, PC4, PC5, . . . ). When requesting an image data processing to a printer other than the printer to which an image data processing has been requested firstly, the client machine checks the security level of the other printer to which the image data processing is to be requested before requesting the image data distribution processing to the other printer. When selecting another printer to which the image data distribution processing is to be requested, the security level in each printer is sufficiently considered.

4 Claims, 5 Drawing Sheets

(56) References Cited

U.S. PATENT DOCUMENTS

| | | | |
|---|---|---|---|
| 7,095,514 B1 * | 8/2006 | Yamagata et al. | 358/1.14 |
| 7,110,541 B1 * | 9/2006 | Lunt et al. | 380/51 |
| 2002/0016921 A1 * | 2/2002 | Olsen et al. | 713/200 |
| 2003/0115326 A1 * | 6/2003 | Verma et al. | 709/225 |
| 2006/0059562 A1 * | 3/2006 | Stefik et al. | 726/26 |

FOREIGN PATENT DOCUMENTS

| | | |
|---|---|---|
| JP | 2001-117744 | 4/2001 |
| JP | 2002-091734 | 3/2002 |
| JP | 2002-268852 | 9/2002 |
| JP | 2003-050685 | 2/2003 |

\* cited by examiner

| PRINTER NAME | PERSONAL AUTHENTICATION | ENCRYPTION | OTHERS |
|---|---|---|---|
| AR-XX1 | YES (FINGERPRINT AUTHENTICATION) | YES | HD ERASING |
| AR-XX2 | YES (PERSONAL IDENTIFICATION NUMBER INPUT) | YES | HD ERASING |
| AR-XX3 | YES (FINGERPRINT AUTHENTICATION) | YES | HD ERASING |
| AR-XX4 | NO | NO | NO |

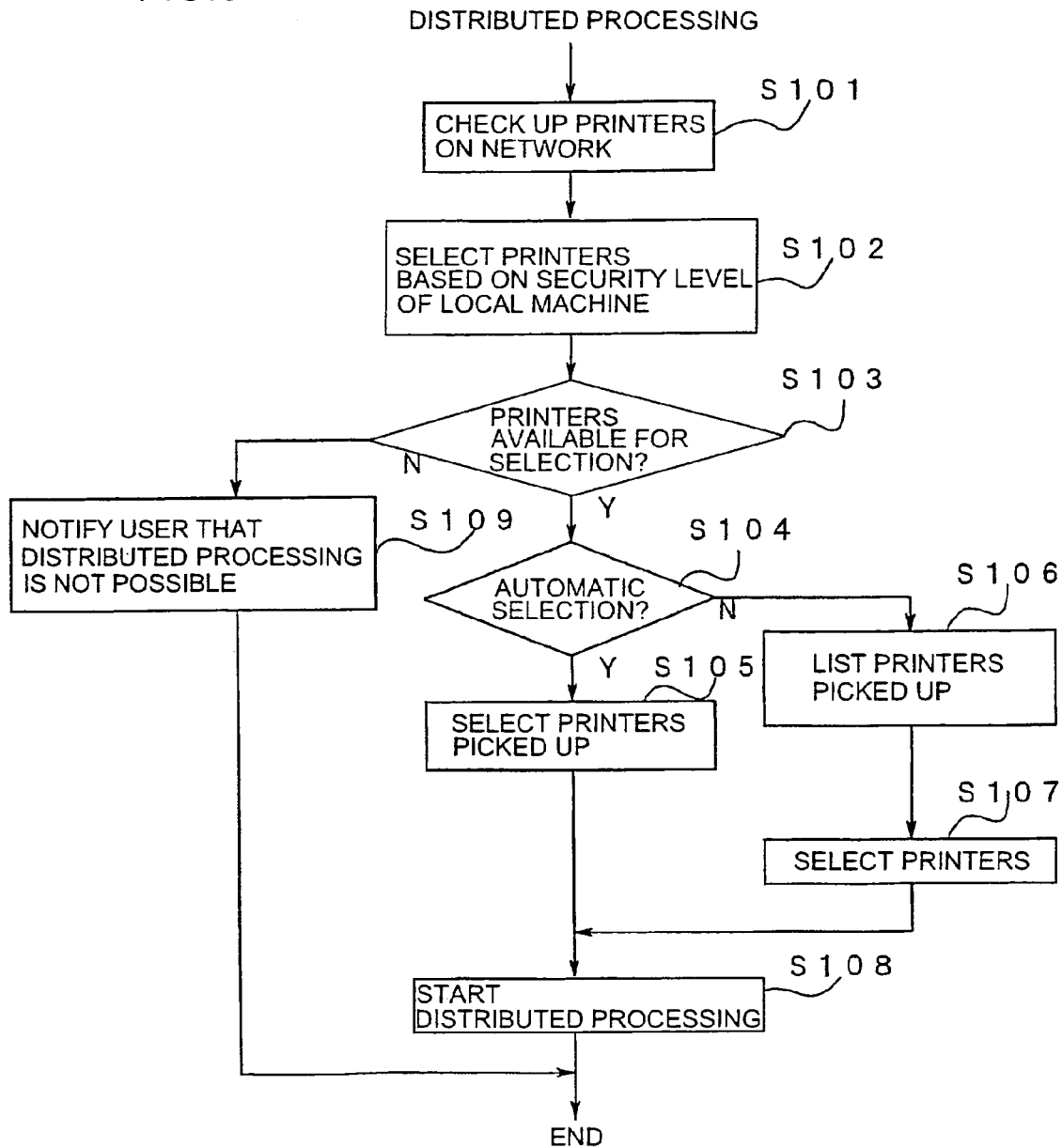

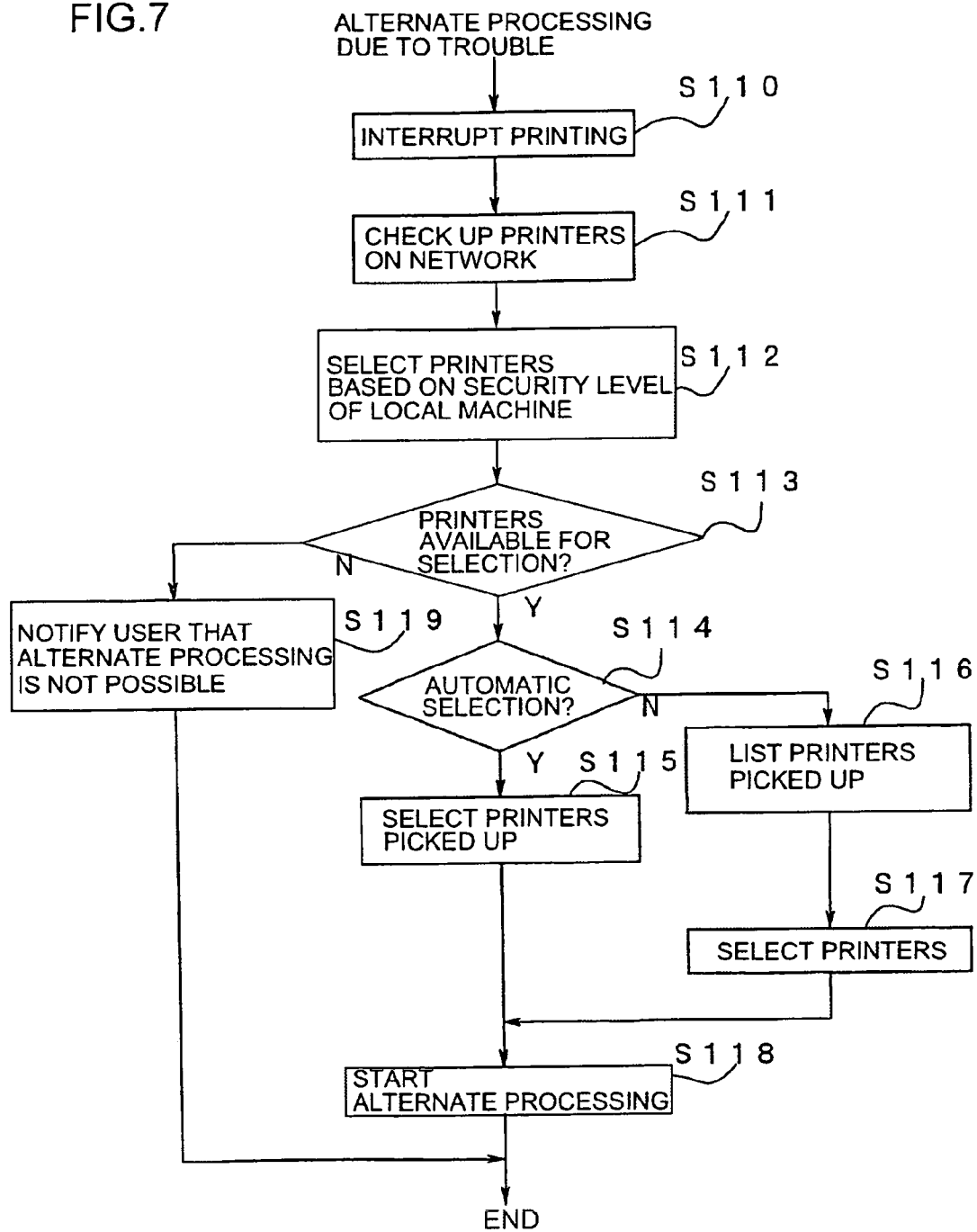

IMAGE PROCESSING DEVICE AND IMAGE PROCESSING SYSTEM

TECHNICAL FIELD

The present invention relates to an image processing device and image processing system which verify security levels of second image data processing means to which the image data processing is to be requested when requesting the second data processing means to perform distributed processing of image data inputted by an image data processing requesting means or alternate processing of subsequent part of the image data in addition to/in place of an image data processing means first requested to process the image data before requesting the image data distributed processing and the alternate processing of subsequent image data to the second image data processing means.

DESCRIPTION OF THE BACKGROUND ART

Conventionally, inkjet printers, laser printers, and the like have been commercialized as printers for personal computers and the like.

On the other hand, with growth in the networking market, network printers to be installed on a network and shared by a plurality of client machines have been introduced into the market.

Against this backdrop, networks with a large number of client machines and a high utilization rate of network printers encounter problems such as suspended processing of print jobs on printers on the network.

A solution to this problem involves installing a plurality of printers on the network, asking each client machine to use the nearest printer, and thereby avoiding concentration of print jobs on specific printers.

When requesting a network printer to process a print job consisting of large amounts of data, print processing speed of the printer requested to process the print job becomes a problem.

A simple solution will be to install high-speed network printers, which, however, are expensive.

Therefore, an image processing system which comprises image forming device and image processing device has been proposed (Patent Document 1: Japanese Patent Laid-Open Publication No. 61-198958).

The image processing system disclosed in Patent Document 1 divides up and output processes a copy job inputted by one image forming device to other image processing device available for distributed processing (distributed processing). Also, while a print job is being processed by image processing device, if one image processing device runs into trouble (paper jam, paper-out condition, low-toner condition, etc.) and can no longer continue subsequent processing, the system makes another image processing device take over the discontinued printing process to complete an output process (alternate processing).

The distributed processing and alternate processing on the network printers are functions which are effective in increasing efficiency and reliability of print jobs on a network. Amid recent growth of security consciousness at companies and offices in terms of protection against leakage of sensitive information, it is required to meet security criteria (consciousness) of users who request processing of print jobs on a network.

However, a problem with the conventional distributed processing or alternate processing methods is that the security levels of devices are not taken into consideration when selecting the devices for distributed processing or alternate processing.

To solve the problems with the conventional techniques, a first object of the present invention is to provide an image processing device in which, an image data processing requesting means verifies security levels of second image data processing means to which the image data processing is to be requested and then requests the second image data processing means to perform distributed processing of image data when requesting the image data processing to the second image data processing means in addition to an image data processing means first requested to process the image data, thereby avoiding concentration of image data on a specific image data processing means, allowing the selected second image data processing means to perform distributed processing of the entrusted image data in conjunction with the image data processing means first requested to process the image data, and keeping security of the image data in mind until the distributed processing of the image data is completed even when improving processing efficiency by the distribution of the image data processing.

A second object of the present invention is to provide an image processing device in which, an image data processing requesting means verifies a security level of a second image data processing means to which the image data processing is to be requested and then requests the second image data processing means to perform alternate processing of the image data in place of an image data processing means first requested to process the image data if the first image data processing means can no longer continue processing subsequent part of the image data when the image data processing means first requested to process the image data processes the inputted image data, thereby preventing the processing of the image data from being suspended on a specific image data processing means, allowing the selected second image data processing means to perform alternate processing of the subsequent part of the entrusted image data in place of the image data processing means first requested to process the image data, and keeping security of the image data in mind until the alternate processing of the image data is completed even when ensuring reliability of image data processing by the alternate processing of the image data.

A third object of the present invention is to provide an image processing system in which, an image data processing requesting means verifies security levels of second image data processing means to which the image distributed processing is to be requested and then requests the second image data processing means to perform distributed processing of image data in addition to an image data processing means first requested to process the image data, thereby avoiding concentration of image data processing on a specific image data processing means, allowing the second image data processing means to perform distributed processing of the image data in conjunction with the image data processing means first requested to process the image data, and keeping security of the image data in mind until the distributed processing of the image data is completed even when improving processing efficiency by the distribution of the image data processing.

A fourth object of the present invention is to provide an image processing system in which, an image data processing requesting means verifies a security level of a second image data processing means to which the image data alternate processing is to be requested and then requests the second image data processing means to perform alternate processing of image data if the first image data processing means can no longer continue processing subsequent part of the image data when the image data processing means first requested to process the image data processes the inputted image data, thereby preventing the processing of the image data from being suspended on a specific image data processing means, allowing the selected second image data processing means to perform alternate processing of the subsequent part of the entrusted image data in place of the image data processing means first requested to process the image data, and keeping security of the image data in mind until the alternate processing of the image data is completed even when ensuring reliability of image data processing by the alternate processing of the image data.

DISCLOSURE OF THE INVENTION

The present invention provides an image processing device, comprising: a plurality of image data processing means which have different security levels and which process inputted image data; and a plurality of image data processing requesting means which request any of the image data processing means to process image data, characterized in that: the image data processing requesting means have a function to verify security levels of second image data processing means to which the image data processing is to be requested and then request the second image data processing means to perform distributed processing of image data when requesting the image data processing to the second image data processing means in addition to an image data processing means first requested to process the image data.

According to the present invention, the given image data processing requesting means verifies security levels of second image data processing means and then requests the second image data processing means to perform distributed processing of image data in addition to an image data processing means first requested to process the image data and gives careful consideration to the security level of each image data processing means when selecting the second data processing means for distributed processing of the image data. This makes it possible to avoid concentration of the image data processing on a specific image data processing means, allowing the selected second image data processing means to perform distributed processing of the entrusted image data in conjunction with the image data processing means first requested to process the image data and keeping security of the image data in mind until the distributed processing of the image data is completed even when improving processing efficiency by the distribution of the image data processing.

In the image processing device of the present invention, the image data processing requesting means have a function to select, from among the plurality of image data processing means, all other image data processing means whose security level is equal to or higher than the security level of the image data processing means first requested to process the image data, and a function to request the selected image data processing means to perform distributed processing of the image data.

According to the present invention, the given image data processing requesting means selects, from among the plurality of image data processing means, all other image data processing means whose security level is equal to or higher than the security level of the image data processing means first requested to process the image data, reliably picks up second image data processing means best suited to actual distributed processing of the image data, and requests the selected second image data processing means to perform distributed processing of the image data. The selected second image data processing means can perform distributed processing of the entrusted image data quickly. Consequently, the security level of the image data is guaranteed until the distributed processing of the image data is completed even when improving processing efficiency by the distribution of the image data processing.

The present invention provides an image processing device, comprising: a plurality of image data processing means which have different security levels and which process inputted image data; and a plurality of image data processing requesting means which request any of the image data processing means to process image data, characterized in that: the image data processing requesting means have a function to verify a security level of a second image data processing means to which the image data processing is to be requested and then request the second image data processing means to perform alternate processing of the image data in place of an image data processing means first requested to process the image data if the first image data processing means can no longer continue processing subsequent part of the image data when the image data processing means first requested to process the image data processes the inputted image data.

According to the present invention, the given image data processing requesting means verifies a security level of a second image data processing means to which the image data processing is to be requested and then requests the second image data processing means to perform alternate processing of the image data in place of an image data processing means first requested to process the image data if the first image data processing means can no longer continue processing subsequent part of the image data. When selecting second image data processing means to which the image data alternate processing is to be requested, the security level in each image data processing means is sufficiently considered. This prevents the processing of the image data from being suspended on a specific image data processing means and allows the selected second image data processing means to perform alternate processing of the subsequent part of the entrusted image data in place of the image data processing means first requested to process the image data, keeping security of the image data in mind until the alternate processing of the image data is completed even when ensuring reliability of image data processing by the alternate processing of the image data.

In the image processing device of the present invention, the image data processing requesting means have a function to select, from among the plurality of image data processing means, all other image data processing means whose security level is equal to or higher than the security level of the image data processing means first requested to process the image data, and a function to request the selected second image data processing means to perform alternate processing of subsequent part of the image data.

According to the present invention, the image data processing requesting means selects, from among the plurality of image data processing means, all other image data processing means whose security level is equal to or higher than the security level of the image data processing means first requested to process the image data, reliably picks up second image data processing means best suited to actual alternate processing of the image data, and requests the selected second image data processing means to perform alternate processing of the image data. The selected second image data processing means can perform alternate processing of the entrusted image data quickly. Consequently, the security level of the image data is guaranteed until the alternate processing of the image data is completed even when ensuring reliability of image data processing by the alternate processing of the image data.

The present invention provides an image processing system, comprising: a plurality of image data processing means which have different security levels and which process inputted image data; and a plurality of image data processing requesting means which request any of the image data processing means to process image data, where the image processing system distributes image data received from one of the image data processing requesting means to second image data processing means available for distributed processing in addition to an image data processing means first requested to process the image data, characterized in that: the data processing requesting means have a function to verify security levels of the second image data processing means to which the image data distributed processing is to be requested and then request the second image data processing means to perform distributed processing of the image data; and the second image data processing means have a function to perform distributed processing of the image data in conjunction with the image data processing means first requested to process the image data.

According to the present invention, the given image data processing requesting means verifies security levels of second image data processing means to which the image data distributed processing is to be requested and then requests the second image data processing means to perform distributed processing of the image data in addition to an image data processing means first requested to process the image data and gives careful consideration to the security level of the second data processing means when selecting the second data processing means to request distributed processing of the image data. This makes it possible to avoid concentration of the image data processing on a specific image data processing means, allowing the second image data processing means to perform distributed processing of the image data together with the image data processing means first requested to process the image data, allowing the selected second image data processing means to perform distributed processing of the entrusted image data in conjunction with the image data processing means first requested to process the image data, and keeping security of the image data in mind until the distributed processing of the image data is completed even when improving processing efficiency by the distribution of the image data processing.

The present invention provides an image processing system, comprising: a plurality of image data processing means which have different security levels and which process inputted image data; and a plurality of image data processing requesting means which request any of the image data processing means to process image data, where the image processing system alternate processes image data inputted by one of the image data processing requesting means to a second image data processing means available for alternate processing in place of an image data processing means first requested to process the image data, characterized in that: the image data processing requesting means have a function to verify a security level of the second image data processing means to which the image data alternate processing is to be requested and then request the second image data processing means to perform alternate processing of the inputted image data if the first image data processing means first requested to process the image data can no longer continue processing subsequent part of the image data; and the second image data processing means has a function to perform alternate processing of the subsequent part of the image data in place of the image data processing means first requested to process the image data.

According to the present invention, the given image data processing requesting means verifies a security level of a second image data processing means to which the image data alternate processing is to be requested and then requests the second image data processing means to perform alternate processing of the image data if the first image data processing means can no longer continue processing subsequent part of the image data and gives careful consideration to the security level of each of the second image data processing means when selecting the second image data processing means to request alternate processing of the image data. This prevents the processing of the image data from being suspended on a specific image data processing means and allows the second image data processing means to perform alternate processing of the subsequent part of the image data in place of the image data processing means first requested to process the image data, keeping security of the image data in mind until the alternate processing of the image data is completed even when ensuring reliability of image data processing by the alternate processing of the image data.

BRIEF DESCRIPTION OF THE DRAWINGS

FIG. 6 is a flowchart illustrating a flow of distributed processing of image data on the image processing device according to the embodiment of the present invention; and FIG. 7 is a flowchart illustrating a flow of alternate processing of image data on the image processing device according to the embodiment of the present invention.

BEST MODE FOR CARRYING OUT THE INVENTION

An embodiment of an image processing device according to the present invention will be described below with reference to the drawings.

Figure 1:
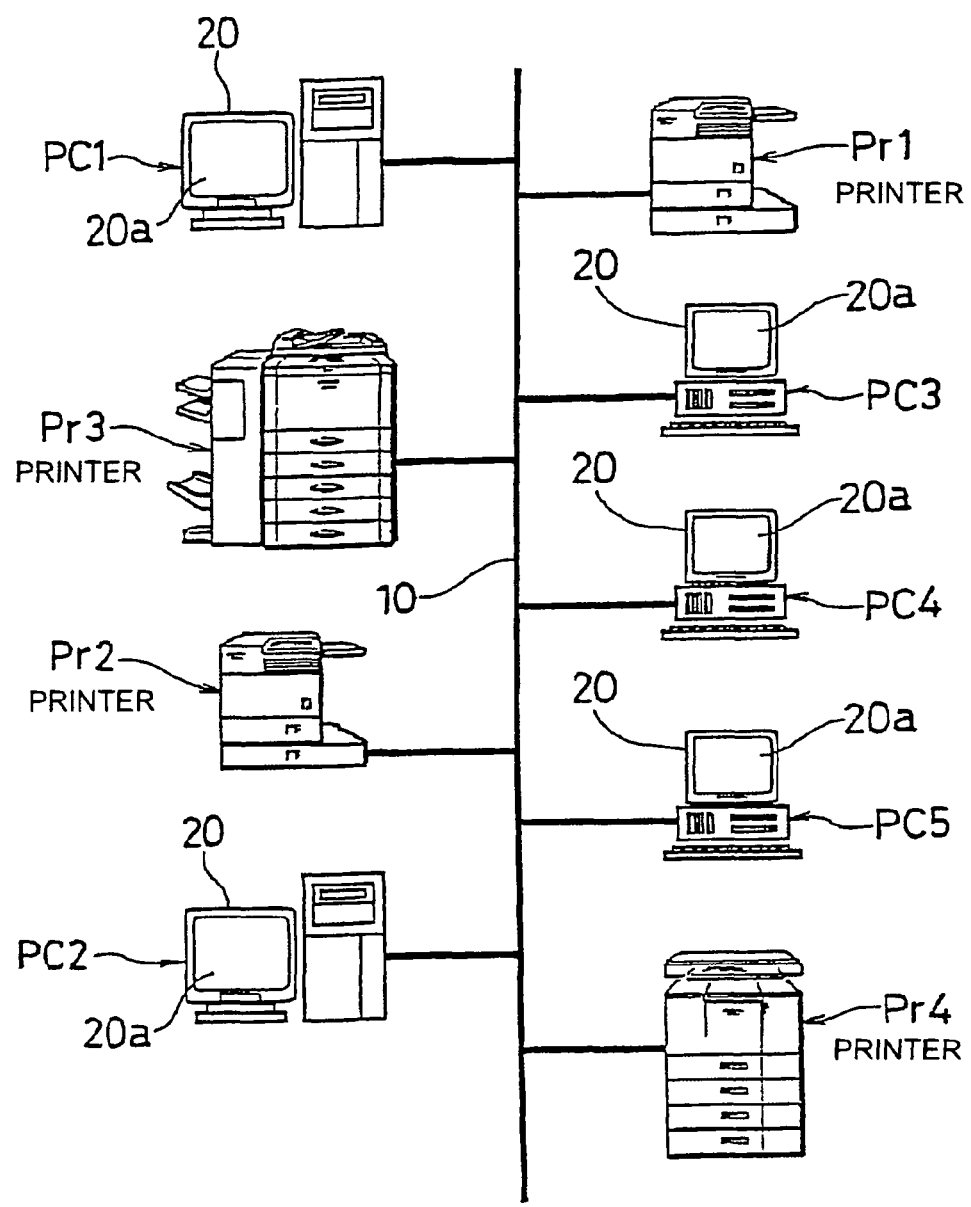
FIG. 1 is an explanatory diagram illustrating a general configuration of an image processing device according to an embodiment of the present invention.

FIG. 1 is an explanatory diagram illustrating a general configuration of an image processing device according to an embodiment of the present invention.

As shown in FIG. 1, the image processing device according to the present invention includes a plurality of image data processing means, namely, printers Pr1, Pr2, Pr3, Pr4, etc. which have different security levels and which process inputted image data; and a plurality of image data processing requesting means, namely, client machines PC1, PC2, PC3, PC4, PC5, etc. such as personal computers (PCs) which request any of the printers Pr1, Pr2, Pr3, Pr4, etc. to process image data. The client machines PC1, PC2, PC3, PC4, PC5, etc. have a function to verify security levels of second printers to which the image data processing is to be requested and then request the second printers to perform distributed processing of image data when requesting the image data processing to other printer except the printer first requested to process the image data.

In the image processing device according to the present invention, the client machines PC1, PC2, PC3, PC4, PC5, etc. have a function to select, from among the plurality of printers Pr1, Pr2, Pr3, Pr4, etc., all other printers whose security level is equal to or higher than the security level of the printer first requested to process the image data; and a function to request the selected printers to perform distributed processing of the image data.

As shown in FIG. 1, the image processing device according to the present invention has the plurality of printers Pr1, Pr2, Pr3, Pr4, etc. and the plurality of client machines PC1, PC2, PC3, PC4, PC5, etc. installed on a network 10.

Figures 2, 3:
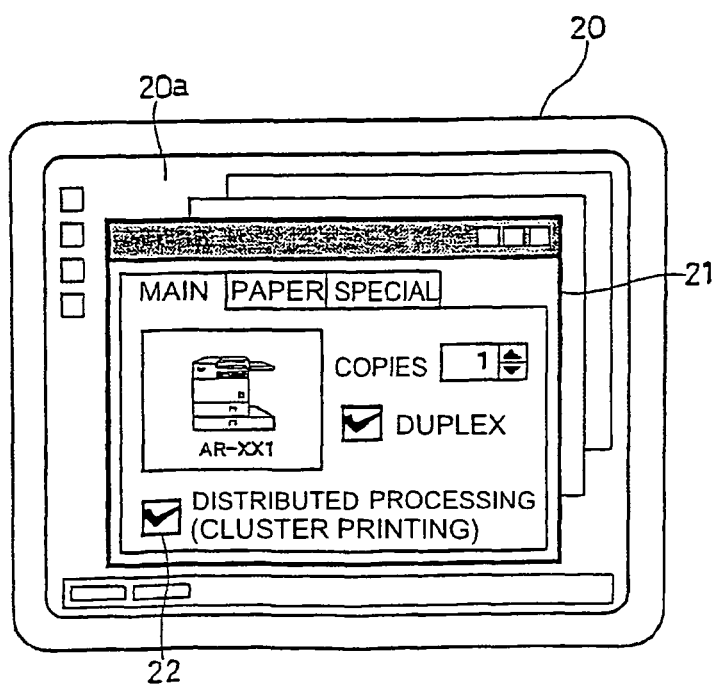
FIG. 2 is an explanatory diagram illustrating an example of security levels of a plurality of image data processing means on the image processing device according to the embodiment of the present invention.
FIG. 3 is an explanatory diagram illustrating a printer driver settings screen opened as a window on a display of a client machine requested to process a print job.

FIG. 2 is an explanatory diagram illustrating an example of security levels of a plurality of image data processing means on the image processing device according to the embodiment of the present invention.

Possible security levels (personal authentication methods, image data processing methods, etc.) of the printers Pr1, Pr2, Pr3, Pr4, etc. are shown in FIG. 2.

As shown in FIG. 2, the printers Pr1, Pr2, Pr3, Pr4, etc. have different security levels in terms of presence/absence of a personal authentication function, encryption function, and hard disk (HD) erasing function depending on printer types.

Regarding the security levels of the printers Pr1, Pr2, Pr3, Pr4, etc., personal authentication methods for users who use the printers include personal authentication based on biometric information such as a fingerprint, the retina, or facial features, personal authentication based on specific information contained in a magnetic card or the like containing specific code information, personal authentication based on code information (personal identification number) such as a password entered directly via a numeric keypad on an operation panel.

The personal authentication based on biometric information provides a high security level, the personal authentication based on specific information contained in a magnetic card or the like carried by individual users provides an ordinary, medium security level, and the personal authentication based on code information (personal identification number) such as a password entered directly via the numeric keypad on the operation panel provides a low security level because of possible leakage of image data.

Processing methods of image data in the device include a method for processing inputted image data in an unencrypted state, method for processing inputted image data by encrypting it, and other methods.

The method for processing inputted image data by encrypting it in the device provides a high security level and the method for processing inputted image data in an unencrypted state provides a low security level.

The security level also depends on whether security measures/functions (hard disk erasing function, access restriction function, etc.) are provided for image data storage devices which store image data.

The security level is high if security measures/functions (hard disk erasing function, access restriction function, etc.) are provided for image data storage devices which store image data, and the security level is low if security measures/functions (hard disk erasing function, access restriction function, etc.) are not provided for image data storage devices which store image data.

The image processing device according to the present invention includes a plurality of printers Pr1, Pr2, Pr3, Pr4, etc. which have different security levels and which process inputted image data; and a plurality of client machines PC1, PC2, PC3, PC4, PC5, etc. which request any of the printers Pr1, Pr2, Pr3, Pr4, etc. to process image data. The client machines PC1, PC2, PC3, PC4, PC5, etc. have a function to verify a security level of a second printer to which the image data processing is to be requested and then request the second printer to perform alternate processing of the image data in place of a printer first requested to process the image data if the first printer can no longer continue processing subsequent part of the image data when the first printer performs processing of inputted image data.

In the image processing device according to the present invention, the client machines PC1, PC2, PC3, PC4, PC5, etc. have a function to select, from among the plurality of printers Pr1, Pr2, Pr3, Pr4, etc., all printers whose security level is equal to or higher than the security level of the printer first requested to process the image data; and a function to request the selected printers to perform alternate processing of subsequent part of the image data.

An image processing system according to the present invention includes a plurality of printers Pr1, Pr2, Pr3, Pr4, etc. which have different security levels and which process inputted image data; and a plurality of client machines PC1, PC2, PC3, PC4, PC5, etc. which request any of the printers Pr1, Pr2, Pr3, Pr4, etc. to process image data. It distributes image data received from one client machine to second printers available for distributed processing in addition to a printer first requested to process the image data. The client machines PC1, PC2, PC3, PC4, PC5, etc. have a function to verify security levels of the second printers to which the image data distributed processing is to be requested and then request the second printers to perform distributed processing of image data in addition to the printer first requested to process the image data. The second printers have a function to perform distributed processing of the image data in conjunction with the printer first requested to process the image data.

The image processing system according to the present invention includes a plurality of printers Pr1, Pr2, Pr3, Pr4, etc. which have different security levels and which process inputted image data; and a plurality of client machines PC1, PC2, PC3, PC4, PC5, etc. which request any of the printers to process image data. It gives image data inputted by one client machine to a second printer available for alternate processing in place of a printer first requested to process the image data; the client machines PC1, PC2, PC3, PC4, PC5, etc. have a function to verify a security level of the second printer to which the image data alternate processing is to be requested and then request the second printer to perform alternate processing of the image data in place of the printer first requested to process the image data if the first printer can no longer continue processing subsequent part of the image data. The second printer has a function to perform alternate processing of the subsequent part of the image data in place of the printer first requested to process the image data.

FIG. 3 is an explanatory diagram illustrating a printer driver window opened to allow print jobs to be specified on application software started on a client machine such as a personal computer.

As shown in FIG. 3, a printer driver settings screen 21 is opened as a window on a display screen 20a of a display 20 of the client machine. If a "Distributed Processing" check box 22 in the lower left corner of the printer driver settings screen 21 is checked on the display 20 of the client machine, the printer driver settings screen 21 is replaced by a "Printer Selection" confirmation screen 23 shown in FIG. 4.

Figure 4:
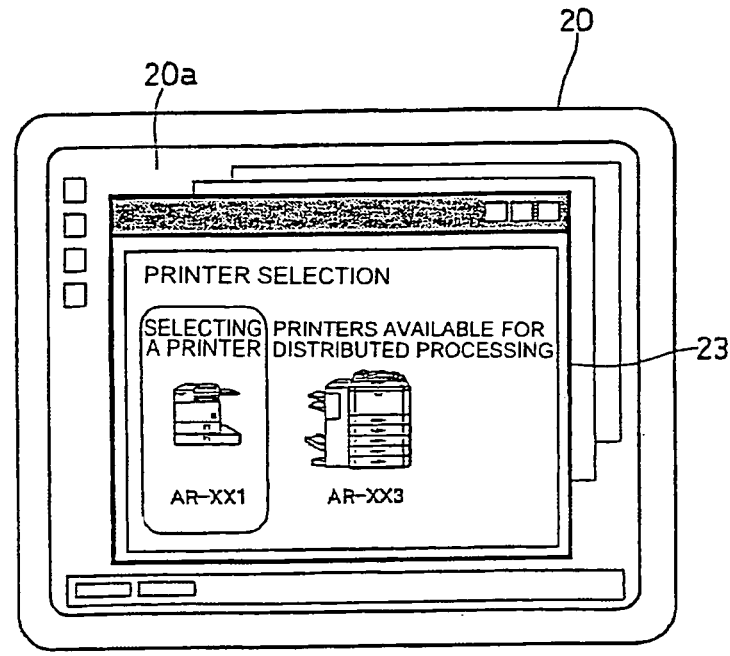
FIG. 4 is an explanatory diagram illustrating a "Printer Selection" confirmation screen opened as a window on a display of a client machine requested to process a print job.

FIG. 4 is an explanatory diagram illustrating the "Printer Selection" confirmation screen brought up on a display window of a client machine which requests a printer on a network to process a print job.

As shown in FIG. 4, the "Printer Selection" confirmation screen 23 is opened as a window on the display screen 20a on the display 20 of the client machine.

FIG. 4 shows a printer Pr1 first requested to process a print job and a second printer Pr2 capable of distributed output.

Figure 5:
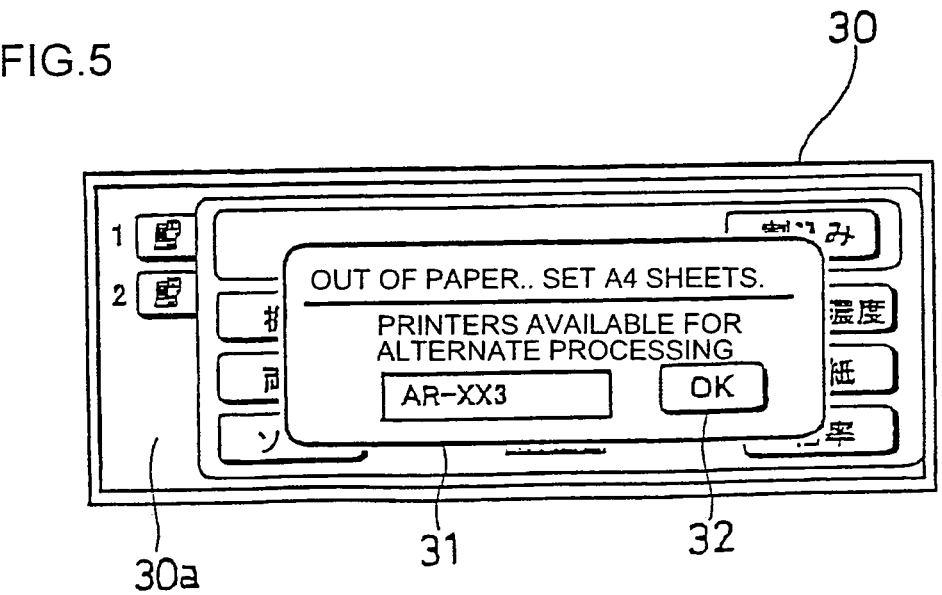
FIG. 5 is an explanatory diagram illustrating a prompt screen brought up on a liquid crystal panel of a client machine requested to process a print job.

FIG. 5 is an explanatory diagram illustrating a prompt screen brought up on a liquid crystal panel of a client machine which requests a printer on a network to process a print job.

As shown in FIG. 5, a prompt screen 31 is opened as a window on a display screen 30a on the liquid crystal panel 30 of the client machine. On the prompt screen 31 on the liquid crystal panel 30, together with a message about a printer problem, a printer name is displayed in a "Printers Available for Alternate Processing" field and an "OK" key 32 is displayed next to the "Printers Available for Alternate Processing" field.

When the user presses (touches) the "OK" key 32 displayed next to the "Printers Available for Alternate Processing" field of the prompt screen 31 on the liquid crystal panel 30 shown in FIG. 5, a printer requested to perform alternate processing of the remaining part of the print job is set manually.

FIG. 6 is a flowchart illustrating a flow of distributed processing of image data on the image processing device according to the embodiment of the present invention.

Distributed processing of print jobs is set by a client machine PC1, PC2, PC3, PC4, PC5, or the like which requests any printers on the network 10 to process the print jobs.

When setting distributed processing of print jobs, if a given printer is requested to process a print job larger than a certain volume (e.g., 100 copies or more), the user can specify distributed output of the print job through distributed processing.

When the user selects distributed processing in the lower left corner of the printer driver settings screen 21 on the display screen 20a on the display 20 of the client machine shown in FIG. 3 (checks the "Distributed Processing" check box 22 shown in FIG. 3), the client machine checks up printers on the network 10 other than a printer first requested to process the print job (Step S101), determines the security level of each of the other printers (the security level may be determined either each time or periodically), and picks up all printers whose security level is equal to or higher than the security level of the printer selected first (Step S102).

If there is no other printer that can be picked up (Step S103: N), the client machine notifies the user that distributed processing of the print job is not possible (Step S109).

On the other hand, if there are other printers that can be picked up (Step S103: Y), the printers for use in actual distributed processing of the print job will be determined. This can be done either automatically or manually.

One of the two selection methods should be specified in advance (Step S104).

If automatic selection has been specified (Step S104: Y), the printers picked up are automatically established to be the printers for use in the actual distributed processing of the print job (Step S105) and the printers picked up perform distributed processing of the requested print job in conjunction with the printer first requested to process the print job (Step S108).

If only a single printer is picked up as a candidate, the single printer may be requested to perform part of distributed processing of the print job. If a plurality of printers are picked up, printers whose security level is equal to or higher than the security level of the printer selected first (requested to perform distributed processing) may be selected automatically or, depending on the level (number of copies) of the print job, a few printers may be selected and requested to perform distributed processing.

On the other hand, if manual selection has been specified (Step S104: N), the printers picked up are listed together with information such as their security levels information and operating status on the prompt screen 31 on the liquid crystal panel 30 of the client machine shown in FIG. 5 (Step S106), allowing the user to manually select printers for request in actual distributed processing of the print job (Step S107).

Since a transparent touch panel (transparent tablet) is laid over the prompt screen 31 on the liquid crystal panel 30 of the client machine shown in FIG. 5, the user can freely select printers for use in the distributed processing of the print job from among the printers picked up and listed on the prompt screen 31 of the liquid crystal panel 30 by simply pressing (touching) appropriate parts of the touch panel.

The selected printers perform distributed processing of the print job in conjunction with the printer first requested to process the print job (Step S108).

FIG. 7 is a flowchart illustrating a flow of alternate processing of image data on the image processing device according to the embodiment of the present invention.

During processing of a print job requested by a client machine on the network 10, if a particular printer (which is processing the print job) can no longer continue processing the print job because the printer runs out of consumables such as paper or developer (Step S110), the client machine checks up printers on the network 10 other than the particular printer which was processing the print job first (Step S111), determines the security level of each of the other printers (the security level may be determined either each time or periodically), and picks up printers whose security level is equal to or higher than the security level of the particular printer which was processing the print job first (Step S112).

If there is no other printer that can be picked up (Step S113: N), the client machine notifies the user that alternate processing of the print job is not available (Step S119).

A possible method for user notification involves displaying a message stating that no printer is available for alternate processing of the print job together with a message prompting the user to supply the consumable on the operation panel of the printer which has stopped processing the print job because it can no longer continue processing the print job.

On the other hand, if there are other printers that can be picked up (Step S113: Y), the printer for use in actual alternate processing of the print job will be determined. This can be done either automatically or manually.

One of the two selection methods should be specified in advance (Step S114).

If automatic selection has been specified (Step S114: Y), the printer picked up is automatically established to be the printer for use in the actual alternate processing of the print job (Step S115) and the printer picked up takes over and completes the requested print job (Step S118).

If only a single printer is picked up as a candidate, the single printer may be requested to perform alternate processing of the print job. If a plurality of printers are picked up, printers whose security level is equal to or higher than the security level of the printer selected first (first requested to process the print job) may be selected automatically.

On the other hand, if manual selection has been specified (Step S114: N), the printers picked up are listed together with information such as their security level information and operating status on the prompt screen 31 on the liquid crystal panel 30 of the client machine shown in FIG. 5 (Step S116), allowing the user to manually select a printer for request in actual alternate processing of the remaining part of the print job (Step S117).

As shown in FIG. 5, the prompt screen 31 on the liquid crystal panel 30 of the client machine displays not only information about the printers picked up, but also information that the print job is suspended because the printer has run out of consumables such as paper during processing of the print job.

Although not shown in the flowchart in FIG. 7, if paper is supplied to the first printer which has suspended processing of the print job due to the paper-out condition, if no other printer has been requested to perform alternate processing of the print job, and if the first printer is ready to resume processing of the print job, the first printer resumes the processing of the print job.

Since a transparent touch panel (transparent tablet) is laid over the prompt screen 31 on the liquid crystal panel 30 of the client machine shown in FIG. 5, the user can freely select printers for request in the alternate processing of the print job from among the printers picked up and listed on the prompt screen 31 of the liquid crystal panel 30 by simply pressing (touching) desired parts of the touch panel.

When a printer for use in actual alternate processing of the remaining part of the print job is selected manually (Step S117), the selected printer performs alternate processing of the remaining part of the print job in place of the printer first requested to process the print job (Step S118).

INDUSTRIAL APPLICABILITY

As described above, in the image processing device according to the present invention, when requesting the image data processing to the other image data processing means other than the first image data processing means, an image data processing requesting means verifies security levels of second image data processing means to which the image data processing is to be requested and then requests the second image data processing means to perform distributed processing of image data in addition to an image data processing means first requested to process the image data and gives sufficiently consideration to the security level of each data processing means when selecting the second data processing means for distributed processing of the image data. This makes it possible to avoid concentration of the image data processing on a specific image data processing means, allowing the selected second image data processing means to perform distributed processing of the entrusted image data in conjunction with the image data processing means first requested to process the image data and keeping security of the image data in mind until the distributed processing of the image data is completed even when improving processing efficiency by the distribution of the image data processing.

In the image processing device according to the present invention, an image data processing requesting means selects, from among the plurality of image data processing means, all other image data processing means whose security level is equal to or higher than the security level of the image data processing means first requested to process the image data, reliably picks up second image data processing means best suited to actual distributed processing of the image data, and requests the selected second image data processing means to perform distributed processing of the image data. The selected second image data processing means can perform distributed processing of the entrusted image data quickly. Since there is no reduction in processing speed of the image data processing means requested to distributed process the image data, there is no need to install high-speed network printers, incurring high equipment cost. Also, the security level of the image data is guaranteed until the distributed processing of the image data is completed even when improving processing efficiency by the distribution of the image data processing.

In the image processing device according to the present invention, an image data processing requesting means verifies a security level of a second image data processing means to which the image data processing is to be requested and then requests the second image data processing means to perform alternate processing of the image data in place of an image data processing means first requested to process the image data if the first image data processing means can no longer continue processing subsequent part of the image data. When selecting second image data processing means to which the image data alternate processing is to be requested, the security level in each image data processing means is sufficiently considered. This prevents the processing of the image data from being suspended on a specific image data processing means and allows the selected second image data processing means to perform alternate processing of the subsequent part of the entrusted image data in place of the image data processing means first requested to process the image data, keeping security of the image data in mind until the alternate processing of the image data is completed even when ensuring reliability of image data processing by the alternate processing of the image data.

In the image processing device according to the present invention, an image data processing requesting means selects, from among a plurality of image data processing means, all other image data processing means whose security level is equal to or higher than the security level of an image data processing means first requested to process the image data, reliably picks up second image data processing means best suited to actual alternate processing of the image data, and requests the selected second image data processing means to perform alternate processing of the image data. The selected second image data processing means can perform alternate processing of the entrusted image data quickly. Consequently, the security level of the image data is guaranteed until the alternate processing of the image data is completed even when ensuring reliability of image data processing by the alternate processing of the image data.

In the image processing system according to the present invention, an image data processing requesting means verifies security levels of second image data processing means to which the image data distributed processing is to be requested and then requests the second image data processing means to perform distributed processing of the image data in addition to an image data processing means first requested to process the image data and gives careful consideration to the security level of the second data processing means when selecting the second data processing means to request distributed processing of the image data. This makes it possible to avoid concentration of the image data processing on a specific image data processing means, allowing the second image data processing means to perform distributed processing of the image data together with the image data processing means first requested to process the image data, allowing the selected second image data processing means to perform distributed processing of the entrusted image data in conjunction with the image data processing means first requested to process the image data, and keeping security of the image data in mind until the distributed processing of the image data is completed even when improving processing efficiency by the distribution of the image data processing.

In the image processing system according to the present invention, an image data processing requesting means verifies a security level of a second image data processing means to which the image data alternate processing is to be requested and then requests the second image data processing means to perform alternate processing of the image data if the first image data processing means can no longer continue processing subsequent part of the image data and gives careful consideration to the security level of the data processing means when selecting the second data processing means to request alternate processing of the image data. This prevents the processing of the image data from being suspended on a specific image data processing means and allows the second image data processing means to perform alternate processing of the subsequent part of the image data in place of the image data processing means first requested to process the image data, keeping security of the image data in mind until the alternate processing of the image data is completed even when ensuring reliability of image data processing by the alternate processing of the image data.

What is claimed is:

1. An image processing device, comprising:
a plurality of image data processing means including at least first and second image data processing means which have different security levels and which process inputted image data; and
one or more image data processing requesting means which request any of the image data processing means to process image data,
wherein the image data processing requesting means specify in advance automatic selection or manual selection of the image data processing means, and
the image data processing requesting means have functions to select, from among the plurality of image data processing means, all other image data processing means whose security level is equal to or higher than the security level of the first image data processing means that is first requested to process the image data, to verify security levels of the second image data processing means to which the image data processing is to be requested, and then to request the second image data processing means to perform distributed processing of image data in addition to the first image data processing means that is first requested to process the image data.

2. An image processing device, comprising:
a plurality of image data processing means including at least first and second image data processing means which have different security levels and which process inputted image data; and
image data processing requesting means which request any of the image data processing means to process image data,
wherein the image data processing requesting means specify in advance automatic selection or manual selection of the image data processing means, and
the image data processing requesting means have functions to select, from among the plurality of image data processing means, all other image data processing means whose security level is equal to or higher than the security level of the first image data processing means that is first requested to process the image data, to verify a security level of the second image data processing means to which the image data processing is to be requested, and then to request the second image data processing means to perform alternate processing of the image data in place of the first image data processing means that is first requested to process the image data if the first image data processing means can no longer continue processing subsequent part of the image data.

3. An image processing system, comprising:
a plurality of image data processing means including at least first and second image data processing means which have different security levels and which process inputted image data; and
image data processing requesting means which request any of the image data processing means to process image data, where the image processing system distributes image data received from the image data processing requesting means to the second image data processing means available for distributed processing in addition to the first image data processing means that is first requested to process the image data, wherein
the data processing requesting means specify in advance automatic selection or manual selection of the image data processing means, and the image data processing requesting means have functions to select, from among the plurality of image data processing means, all other image data processing means whose security level is equal to or higher than the security level of the first image data processing means that is first requested to process the image data, to verify security levels of the second image data processing means to which the image data distributed processing is to be requested, and then to request the second image data processing means to perform distributed processing of the image data; and
the second image data processing means have a function to perform distributed processing of the image data in conjunction with the first image data processing means that is first requested to process the image data.

4. An image processing system, comprising:
a plurality of image data processing means including at least first and second image data processing means which have different security levels and which process inputted image data; and
image data processing requesting means which request any of the image data processing means to process image data, where the image processing system alternated processes image data inputted by the image data processing requesting means to the second image data processing means available for alternate processing in place of the first image data processing means that is first requested to process the image data,
wherein the image data processing requesting means specify in advance automatic selection or manual selection of the image data processing means, and the image data processing requesting means have functions to select, from among the plurality of image data processing means, all other image data processing means whose security level is equal to or higher than the security level of the first image data processing means that is first requested to process the image data, to verify a security level of the second image data processing means to which the image data alternate processing is to be requested, and then to request the second image data processing means to perform alternate processing of the inputted image data if the first image data processing means that is first requested to process the image data can no longer continue processing subsequent part of the image data; and
the second image data processing means has a function to perform alternate processing of the subsequent part of the image data in place of the first image data processing means that is first requested to process the image data.

* * * * *